Patented Oct. 22, 1935

2,018,637

UNITED STATES PATENT OFFICE 2,018,637

PACKAGE OF CHEESE AND PROCESS OF PREPARING SAME

Charles F. Doane, Salem, Oreg.

No Drawing. Application March 26, 1929, Serial No. 350,133

11 Claims. (Cl. 99—11)

This invention relates to improvements in package of cheese and method of handling the cheese in preparing the said package.

The desirability of having cheese in small packages of suitable size, for being dispensed directly to the retail trade or consumers, is so well appreciated that it needs little discussion here. To produce a cheese of the best quality, and especially some types of cheese, it has generally heretofore been deemed necessary that the cheese be made and ripened in units of considerable size. For instance, in the case of Swiss cheese, in order to get the most desirable properties therein, the usual size of the cheese is about 160 pounds or larger, while in the case of American cheese, it is usually put up in units of from 22 pounds to 75 pounds. Recently, there have been efforts put forth to prepare small sized American cheese, but it has been found that if such small packages of cheese are kept any length of time there is a tremendous loss from both shrinkage and the formation of rind. Efforts have also been made to cut a large piece of cheese into small pieces or sub-divisions of the desired width and size and to protect the surfaces formed by the cutting by some suitable covering material. In preparing these small units of cheese, it is especially desirable to protect the cheese from mold and for this purpose the cut surfaces have been sealed by tin foil, or the like, and it has always been considered necessary to bring the tin foil or other covering material into intimate contact with the cheese at all points so as to exclude air therefrom. That is, it has always been deemed necessary to prevent air gaining access to the surfaces of the cut cheese and for this reason was planned to be used only for cheese which is rather solid. Its application to Swiss cheese, or other cheese in which there are holes or any appreciable eye development, has been impracticable because of the air content of such voids in the cheese. Again, small packages of various kinds of cheese have been prepared by grinding the cheese and then heating it until it was brought to a plastic condition after which it was molded into packages. By this method the surfaces of cheese made intomate contact with the walls of the package so as to prevent molding, but this treatment of the cheese, and especially the heating, was detrimental to both its original fine flavor as well as its texture. It has now been discovered that a fresh cut cheese has the property of creating at its surface an atmosphere which inhibits mold growth and resists the growth of certain other micro-organisms. That is, it has been found that under certain conditions cheese has the property of generating within itself a preservative gas which may be formed into what might be termed a gaseous envelope at the surface of the cheese so that the preservative properties of such gas can be utilized in the protection of the cheese by preventing mold growth, etc. Having discovered that such a protective or preservative atmosphere is developed by the cheese it is only necessary to so package the cheese and especially fresh cut cheese in such fashion as to retain such protective atmosphere at the surface of the cheese instead of exposing the cut surface to the air and permitting the gaseous envelope to mix with the surrounding air and be quickly carried away and dissipated. In view of this knowledge, it is proposed to enclose the cheese, and especially cheese freshly cut into small sub-divisions, in a sealed container, thereby preserving the preservative gaseous envelope and retaining it in contact with the cut surface of the cheese. If desired, the cheese may be wrapped with suitable material of preferably parchment or wax paper on which may be printed a brand or label. The use of metallic foils as a wrapping is unnecessary.

The cheese may be in single pieces or may be cut into slices ready for serving in sandwiches, or it may be cut and wrapped in small pieces for individual service, a number of such pieces being enclosed in a single container. The important point is to preserve the atmosphere produced by the cheese. Wrapping of the individual pieces of cheese is not absolutely essential, and where a wrapper is used intimate contact between the wrapper and cheese is not necessary, although it has, heretofore, been thought that such intimate contact between the wrapper and cheese was necessary. Where wrapping is done, the wrapper may be applied loosely by an ordinary wrapping machine and there is no need of contact between the surface of the cheese and the walls of the container in which it is sealed, but to have the gaseous envelope of sufficient concentration or strength so that its desirable preservative properties will not be detrimentally effected, the unoccupied space in the container or enclosure should not be too great. However, where the unoccupied space in the finished package was equal to the volume of cheese, the product has been found to keep well, but it is obvious that in commercial operations economy alone would indicate that it would be undesirable to have the containers unnecessarily large. On the other hand, it is preferred that the volume of cheese occupy not more than 80 percent of the container.

A further advantage obtained by the present invention is that certain types of cheese, such as American cheese, may be packaged during the time it is ripened or even while green, and then ripened in the presence of the preservative atmosphere which is emitted therefrom. Cheese ripened under these conditions has been found to possess a much more delicious flavor and a better texture than the same cheese ripened in the usual manner. Ripening cheese in accordance with the present invention, therefore, offers an opportunity of supplying cheese that will satisfy the various tastes of many consumers as the cheese may be obtainable either when very mild, or highly ripened or at any intermediate stage. In fact, consumers wishing a highly ripened cheese may hold a cheese in a present package in their own cupboards or the like until it has attained the degree of ripeness which suits their taste. Regardless, however, of the time at which the cheese in the present package is ripened and regardless of the time in which it is held in such package, there is no loss caused by rind formation on the cut surfaces or by mold development or by moisture evaporation.

A specific method or procedure that has been followed in carrying out the present invention, and which has been found to give highly satisfactory results, consists, in the case of American Cheddar cheese, in removing the rind from the cheese which may be from one to two months of age. The cheese is then cut in sub-divisions of a desired weight and shape, the individual pieces weighing, say, about two ounces. The sub-divisions or pieces are then wrapped, while still freshly cut, in paraffin paper, each piece preferably being wrapped separately and a number of such wrapped pieces are then placed in glass jars and sealed therein. Preferably, but not necessarily, these steps are carried out at a temperature somewhat below 60° F. and after the jars have been sealed their temperature is then raised to approximately 60° F. and held at such temperature until the cheese contained therein has reached the desired stage in ripening. With Emmental or the Swiss type of cheese the cheese may be ripened in large loaves or blocks until the eyes are completely formed and the cheese has the desired amount of salt. It then, likewise, is cut into small pieces or sub-divisions of the desired shape and weight and the pieces, while still in a freshly cut state, individually wrapped into paraffin paper. The desired number of wrapped pieces are then placed in glass jars or other suitable containers when the contents may be sealed air tight. As in the case of American cheese these steps should be carried out at the same temperatures, but in the case of the Swiss type of cheese care should be taken to have the cubic content of the jars or containers at least three-quarters filled with the cheese, while in the cast of American cheese the cheese need not occupy much more than half the space within the jar or container. While American and Swiss cheese alone have been referred to it will be understood that the present package and the method of producing the same may be utilized in the handling of other varieties of cheese which possess the property of developing within themselves a preservative atmosphere. The step of wrapping the individual pieces of cheese before they are sealed in their ultimate container may be dispensed with, but such step is preferably employed because such wrapping tends to hold the preservative atmosphere in more or less concentrated form closer to the surfaces of the cheese during the period when such gaseous preservative atmosphere is initially given off by the cheese. In other words, during the initial formation of the preservative gaseous atmosphere the wrappers on individual pieces of cheese will prevent its commingling with or dilution by the air content of the jar.

The simplicity of this proposed method and the resulting package is such that it is difficult to appreciate what enormous new possibilities in the field of cheese handling are made available by the present discovery. It offers the possibilities which those in the cheese industry have been seeking for years, in that, there is at once available a means for dispensing small packages of normal untreated cheese with all of its original fine flavor and texture unimpaired. The cheese packaged in accordance with the present invention may be kept indefinitely without the formation of rind on the cut surfaces thereof and the moisture content thereof remains substantially unchanged. One fact, which should be pointed out specifically in order that the value of this invention may be appreciated, is that in the case of Swiss cheese, it may be placed in the hands of the public in its original condition, in that a package in accordance with the present invention will possess its usual eye development, flavor and texture, a result that is impossible of attainment under present processes of packaging wherein the cheese is melted in order to bring its surfaces in intimate contact with its wrapping or the walls of the containers in which it is enclosed.

What I claim is:

1. The method of packaging cheese which consists in cutting a large cheese to prevent growth of mold thereon into a plurality of comparatively small sub-divisions, covering said sub-divisions to form a space around the surface of each sub-division and retaining in such spaces a preservative gaseous envelope generated from the cheese, and loosely confining and sealing the covered sub-divisions in a container.

2. The method of handling cheese to prevent the growth of mold thereon which consists in cutting a large cheese into a plurality of sub-divisions, wrapping said sub-divisions while in the ripening stage in a gas retaining covering with a space between said covering and cheese, and loosely depositing the covered sub-divisions in a sealed container.

3. The method of handling cheese to prevent the growth of mold thereon which consists in cutting a large cheese into a plurality of sub-divisions, wrapping said sub-divisions while in the ripening stage in a gas retaining covering with a space for a film of gas between the cheese and covering, loosely depositing the covered sub-divisions in a sealed container, and raising the temperature of said container to approximately 60° F. to expedite ripening of the cheese.

4. A package of cheese comprising cheese enveloped in a preservative gaseous envelope in a sealed container in which said cheese is loosely confined, the gaseous contents of said container constituting at least 20% of the total volume of the contents of said container.

5. A package of cheese comprising a plurality of small sub-divisions wrapped in a gas retaining covering and sealed in a container said sub-divisions being loosely confined in said container and there being a film of preservative gas between the sub-divisions and their coverings.

6. A package of cheese comprising a plurality of pieces of cheese wrapped in a covering with a space therein in which is retained between said covering and cheese the preservative gas given off by the cheese, said wrapped pieces of cheese being loosely confined within and sealed in an air tight container.

7. A package of cheese comprising a plurality of pieces of cut cheese wrapped in a covering with a space between the covering and cheese in which there is retained a portion of the preservative gases given off by the cheese, the wrapped pieces of cheese being loosely confined within and sealed in an air tight container with the cheese constituting not more than 80% of the contents of said container.

8. The method of handling cheese which consists in packaging the cheese during ripening in a container which will retain the preservative gaseous atmosphere produced by the cheese to prevent the growth of mould thereon, said container at the time of packaging having space provided therein for air.

9. The method of handling Cheddar cheese which consists in packaging the cheese during ripening in a container which will retain the preservative gaseous atmosphere produced by the cheese to prevent the growth of mould thereon, said container at the time of packaging having space provided therein for air, and then raising the temperature of the package to a point above the temperature of the cheese at the time of sealing the container.

10. The method of packaging cheese which consists in partially ripening the cheese in the presence of air, then dividing the partially ripened cheese into a plurality of sub-divisions, depositing and sealing said sub-divisions in a container which will retain the preservative gaseous atmosphere produced by the cheese to prevent the growth of mould thereon, said container at the time of packaging and sealing having a space provided therein for air and then raising the temperature of the package to a point above the temperature of the cheese at the time of sealing the container.

11. The method of handling cheese which consists in packaging substantially unripened cheese in a container, said container at the time of packaging said cheese having a space provided therein for air, whereby the ripening of said cheese will be facilitated by the presence of air in said space, the preservative gaseous atmosphere produced by the cheese during ripening in the container being retained therein and preventing the growth of mold on the packaged cheese.

CHARLES F. DOANE.